(12) United States Patent
Weghaus (10) Patent No.: US 10,800,380 B2
(45) Date of Patent: Oct. 13, 2020

(54) ACCESS AND DRIVE AUTHORIZATION SYSTEM WITH INCREASED SAFETY AGAINST RELAY STATION ATTACKS BY VERIFICATION OF LOCATION

(71) Applicant: Hella KGaA Hueck & Co., Lippstadt (DE)

(72) Inventor: Ludger Weghaus, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/736,151

(22) PCT Filed: Jun. 1, 2016

(86) PCT No.: PCT/EP2016/062390
§ 371 (c)(1),
(2) Date: Dec. 13, 2017

(87) PCT Pub. No.: WO2016/202592
PCT Pub. Date: Dec. 22, 2016

(65) Prior Publication Data
US 2018/0148015 A1  May 31, 2018

(30) Foreign Application Priority Data
Jun. 15, 2015  (DE) .................. 10 2015 109 468

(51) Int. Cl.
*B60R 25/24* (2013.01)
*G07C 9/00* (2020.01)
(Continued)

(52) U.S. Cl.
CPC ............ *B60R 25/24* (2013.01); *G01C 21/165* (2013.01); *G01C 21/18* (2013.01);
(Continued)

(58) Field of Classification Search
CPC combination set(s) only.
See application file for complete search history.

(56) References Cited

U.S. PATENT DOCUMENTS

2011/0255764 A1* 10/2011 Lin .................. G06T 19/00
382/131
2014/0338151 A1* 11/2014 Mitchell ............ E05D 7/00
16/223
(Continued)

FOREIGN PATENT DOCUMENTS

DE        10052451 A1    5/2002
DE     102011013605 A1   9/2012
(Continued)

*Primary Examiner* — Thomas S McCormack
(74) *Attorney, Agent, or Firm* — Husch Blackwell LLP (57) ABSTRACT

An authorization system for vehicles, comprising at least one authentication element, at least one device for the location of the authentication element, and at least one compare unit. The authentication element, comprises: at least one wireless interface for the sending and/or receiving of at least one location data signal generated on the vehicle; at least one inertial sensor element for the detection of inertial data; at least one inertial data interface for the sending and/or receiving of inertial data; and at least one location data signal exchange interface for the exchange of location data signals with the compare unit. The compare unit comprises at least one reception device for the reception of the location signal data and the inertial data, and at least one processing unit for the generation of compare data based on the location signal data and the inertial data.

8 Claims, 4 Drawing Sheets

(51) Int. Cl.
 *G01C 21/16* (2006.01)
 *G01C 21/18* (2006.01)
(52) U.S. Cl.
 CPC ............... *G07C 9/00309* (2013.01); *G07C 2009/00555* (2013.01); *G07C 2209/63* (2013.01)

(56) References Cited

U.S. PATENT DOCUMENTS

| | | |
|---|---|---|
| 2014/0375420 A1 | 12/2014 | Seiberts et al. |
| 2014/0375423 A1 | 12/2014 | Lagabe |
| 2016/0075307 A1* | 3/2016 | Jakobsson ............... B60R 25/31 701/2 |

FOREIGN PATENT DOCUMENTS

| | | |
|---|---|---|
| DE | 102014200159 A1 | 10/2014 |
| EP | 1721793 A1 | 11/2006 |
| FR | 2986202 A1 | 8/2013 |

* cited by examiner

ACCESS AND DRIVE AUTHORIZATION SYSTEM WITH INCREASED SAFETY AGAINST RELAY STATION ATTACKS BY VERIFICATION OF LOCATION

CROSS REFERENCE

This application claims priority to PCT Patent Application No. PCT/EP2016/062390, filed 1 Jun. 2016, which itself claims priority to German Application No. 10 2015 109468.1, filed 15 Jun. 2015, the entirety of both of which are hereby incorporated by reference.

FIELD OF THE INVENTION

The invention relates to access systems for vehicles having at least one authentication element, at least one device for locating the authentication element and at least one compare unit. Furthermore, the invention relates to a procedure for the verification of the authorization of an authentication element by means of an authorization system.

BACKGROUND OF THE INVENTION

Known authorization systems for vehicles, such as e.g. passive, so-called hands-free entry/go systems or keyless entry systems, do not require that users holds an authorization means, i.e. a key in their hands to trigger certain actions.

With such systems it is, therefore, e.g. possible to unlock a vehicle without the active use of an authorization means or a key and to start by the mere pushing of a start button. This is made possible by the authorization means, i.e. a keyless entry key with a chip, which the user carries.

In systems according to the state of the art, the vehicle sends a weak signal with a range of a few meters, which the authorization system receives. The authorization means then sends a signal to the vehicle, which the vehicle uses to decide, if it is dealing with an authorized authorization means and if, based on this, access or drive authorization orders can be realized.

Such authorization systems are therefore no longer based on a conscious user interaction with the authorization means, they only check whether the authorization means is in the immediate vicinity of the vehicle—in case of access—, or in the vehicle—in case of a drive authorization—at moments when a verification of the authorization shall take place.

In the context of these authorization—, or keyless entry systems, attack scenarios which are also based on the specific properties of the related technologies come into focus.

By now, attack scenarios are known, where the relevant transmission path of the authorization system, i.e. the transmission path between key and vehicle is extended. These are the so-called relay station attacks (RSA).

In such a relay station attack, the signal of the vehicle to the authorization means is relayed i.e. extended by means of a pair of antennas. Herein, one antenna/one relay station needs to be close (typically less than 2 meters) to the vehicle and the other antenna/relay station needs to be close (typically less than 2 meters) to the authorized authorization means. The distance between the two relay stations (transmission path extension stations) can here be very large and depends merely on the actual implementation of the relay stations, whose aim is typically criminal in nature. It cannot be assumed that regulatory laws will have a limiting effect in this case.

The vehicle can hence be opened and/or started by means of a relay station attack although the relevant authorization means is outside the usual distance for the opening and the drive authorization for the vehicle.

SUMMARY OF THE INVENTION

The invention has therefore the task of delivering an authorization system for vehicles and a process for the verification of the authorization of an authentication element with an authorization system, in which a relay station attack can be prevented with little technical effort and in a simple manner while maintaining the overall concept of the keyless entry system for the user.

The task according to the invention is solved in particular by the characteristics of the independent patent claims. Advantageous further embodiments of the present invention are described in the subclaims.

The authorization system for vehicles comprises at least one authentication element, at least one device for the location of the authentication element and at least one compare unit. Herein, the authentication element, particularly a key of a keyless-go-means for a vehicle, for example an automobile, has at least one wireless interface for the sending and/or receiving of at least one location data signal generated on the vehicle, at least one inertial sensor element for the detection of inertial data in connection with at least one movement and/or at least one acceleration of the authentication element, at least one inertial data interface for the sending and/or reception of inertial data. The device for the location of the authentication element is intended for arrangement on the vehicle, particularly in and/or on an automobile, and herein the device comprises at least one wireless device for the sending and/or receiving of the location data signal and at least one location data signal exchange interface for the exchange of location signal data with the compare unit. The compare unit comprises at least one reception device for the reception of the location signal data and the inertial data and at least one processing unit for the generation of comparative data based on the location signal data and the inertial data. The location signal data may be identical with the location data signal, they can comprise all, or part of them or the location signal data can be obtained on the basis of one or several location data signals.

The invention is based on the basic idea that the verification of the authorization of the authentication element, particularly with regard to the access authorization, i.e. the opening of the vehicle and also the drive authorization, is not verified only by means of the position of the authentication element relative to the vehicle, i.e. to the device and for the location of the authentication element, but that in addition it is tested, as a plausibility check, whether the movement and acceleration data, i.e. the inertial data of the authentication element correlate with the location data of the authentication element, which are determined by the device on the vehicle for the location of the authentication element.

If these data correlate, access and/or drive authorization is granted by the vehicle, otherwise not. This allows the detection and fending off of a relay station attack in a particularly effective and simple manner.

In the entire description, movement is preferably understood as a rectilinear motion along a path, which may, however, comprise one or several curves. Also, movement is understood as a change in position of an observed object over time.

Preferably, the authentication element is a UID or a key (e.g. remote control key), a keyless-go means for a vehicle or a keyless-entry-key. It is also possible to realize the authentication element by means of a mobile device, such as a mobile phone, a tablet PC, a notebook, and/or another mobile, i.e. portable device.

Advantageously, the authentication element has a wireless interface for the sending and receiving of an authentication signal and preferably a sensor element for the detection of an inertial movement. Herein, the authentication element can have a single wireless interface being used for the sending and/or receiving of the, at least one, location data signal generated on the vehicle and also for the sending and/or receiving of the inertial data. It is also conceivable, however, that a separate inertial data interface is provided for the sending and/or receiving of inertial data. In principle, it is conceivable that the wireless interface for the sending and/or receiving of the, at least one, location data signal generated on the vehicle also comprises the inertial data interface for the sending and/or receiving of inertial data.

Preferably, the device is arranged on the vehicle, in particular in or on an automobile. Therefore, the device is connected with the vehicle and can for example be used to open it and/or to start it.

Furthermore, it can be provided that the inertial sensor element is a MEMS-acceleration sensor. In particular, the inertial sensor element can be a simple acceleration sensor based on 3-axis-MEMS, by means of which three degrees of freedom are detectable.

Furthermore, the inertial sensor element can be a combined MEMS-acceleration and gyro-sensor. A combined sensor, which can in addition detect gyro-data, allows the detection and verification of six degrees of freedom.

Furthermore, the inertial sensor element can be a combined MEMS-acceleration, gyro- and magnetic sensor. Such a combination allows the verification of nine degrees of freedom.

Furthermore, the inertial sensor element can be activatable by means of a wake-up signal when the vehicle is approached. This has the advantage that the inertial sensor element does not need to be permanently activated and is only activated when the vehicle is approached. This relieves the battery of the authentication element. In this context, it is in particular conceivable that cyclical wake-up signals are sent by the device for the location of the authentication element. The signals can be detected by the authentication element and lead to the activation of the inertial sensor element when detected.

Furthermore, the present invention relates to a procedure for the verification of the authorization of an authentication element with an authorization system, in particular with an authorization system as described above, wherein the authorization system comprises at least one authentication element, at least one device for the location of the authentication element and at least one compare unit, and wherein the procedure comprises at least the following steps:

The location data of the authentication element are determined relative to the device;

The inertial data are determined in connection with at least one movement and/or at least one acceleration of the authentication element between at least two points in time $t=t1$ and $t=t2$.

The location data and the inertial data are compared;

The authorization of the authentication element is verified by comparing the location data and the inertial data.

All structural and/or functional characteristics described above as well as advantages of the authorization system described above can be realized and applied individually or in combination also in the procedure for the verification of the authorization by means of an authorization system.

Furthermore, it can be provided that an authorization can only be assigned if the comparison of the location data with the inertial data shows that the location data and the inertial data correlate sufficiently with one another. In particular, it can be verified whether the movement data of the authentication element, which are determined by several time-delayed location measurements (e.g. via trilateration per LF-H field measurement or Time-Off Light (TOF), e.g. based on acoustic signals or based on Angle-of-Arrival (AoA)), can be correlated with values from for example the MEMS-based inertial navigation. Only if this is the case, is the location measurement (possibly attackable by RSA) verified and a relay station attack can therefore be excluded. In other words, an authentication process is only successfully completed when the data from the inertial navigation and the location data generated on the vehicle match, taking into account the specified tolerances, e.g. measurement tolerances.

This can be achieved when the authentication element executes this verification itself and sends a valid response (authentication signal) to the vehicle only in case of conformance, which in turn unlocks; or it can be achieved when the authentication element only sends encoded, raw, or preprocessed measuring data to the vehicle, so that the vehicle can execute this verification analysis, and, based on this, decides on its own in favor of or against a successful authentication. This method has in particular two advantages, as by this means the communication between the authentication element and the vehicle is always the same and an attacker, therefore, cannot immediately detect why the authorization was not granted, and furthermore the advantage that the larger energy source of the vehicle can be used as well as it's logic which is more powerful because of the larger installation space.

Normally, there is always conformance, so that the authentication process can be executed successfully and the user gains access to his/her vehicle. In case of a relay station attack or a transmission path extension, the data from the inertial navigation do not match the location data. In this case, the authentication process has a negative result and the attack fails.

The location data can comprise the pattern of the location data of the navigation element. It is in particular necessary that at least two location data are available, which can then be compared with the respective inertial data. To this end, respective time examinations are correlated, for example the change in the location data from PUID (x1, y1, z1) at the point in time $t=t1$ to PUID (x2, y2, z2) at the point in time $t=t2$ with the location change (dx, dy, dz), which can be deduced from the inertial data at the point in time $t=t1$ and $t=t2$. Here, particularly the existence of gravity acceleration is capitalized on, as it is used by the evaluation electronics to specify the alignment in z-direction (vertical to the earth's surface) to the UID. Accelerations in the absolute z-direction (direction of gravity), which are identical for the vehicle and for the UID, and the location changes (delta-z) between these two points, which can be inferred from these, can therefore be calculated directly. For the two other coordinate directions x and y in the horizontal plane, two optional methods of examination exist: In a first approach, a mathematical rotation operation around the z-axis (gravitation axis) can be executed, in which an angle is searched in several steps of the rotation, resulting in a sufficient correlation for the location change in the x-y plane for the change in location coordinates. In addition to a mere examination of the z-plane, this can therefore be considered as a further level of plausibilization.

An even higher level of plausibilization results from the second approach, in which the x-y alignment of the authentication element is determined from the H-field measurements in the authentication element during the trilateration. As therefore at least one location point must be recognized before the user has reached the vehicle, the vehicle creates signals (e.g. a magnetic field or an electromagnetic wave) in a cyclic manner (e.g. in a pattern of a few seconds) to this end, which wake the UID from a deep, energy-optimizing sleep mode and by this let it know, that it needs to start with the recording of the inertial navigation data (e.g. accelerations, gyro-data, etc.). This is a significant aspect, as the energy source in the authentication element can be very limited and a permanent operation is not or not normally possible.

During the verification of the authorization, it can be verified whether the location data comprise at least one stationary position of the authentication element. By means of this additional constraint, it is checked, whether during the authentication process, the authentication element is more or less stationary, which would be expected at the moment when the door is opened, and which can be verified with location measurement as well as with inertial navigation. In particular, it can be verified, whether during a predefinable time window the acceleration and speed of the authentication element is zero or almost zero and whether these data correlate with the opening of the door or an attempt at opening the door. This in turn can be verified with the location data of the authentication element, as these data must correlate with the location data existing in connection with the door, an attempt at opening it or the opening of the door.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the description below, identical reference signs are used of identical objects.

Figure 1:
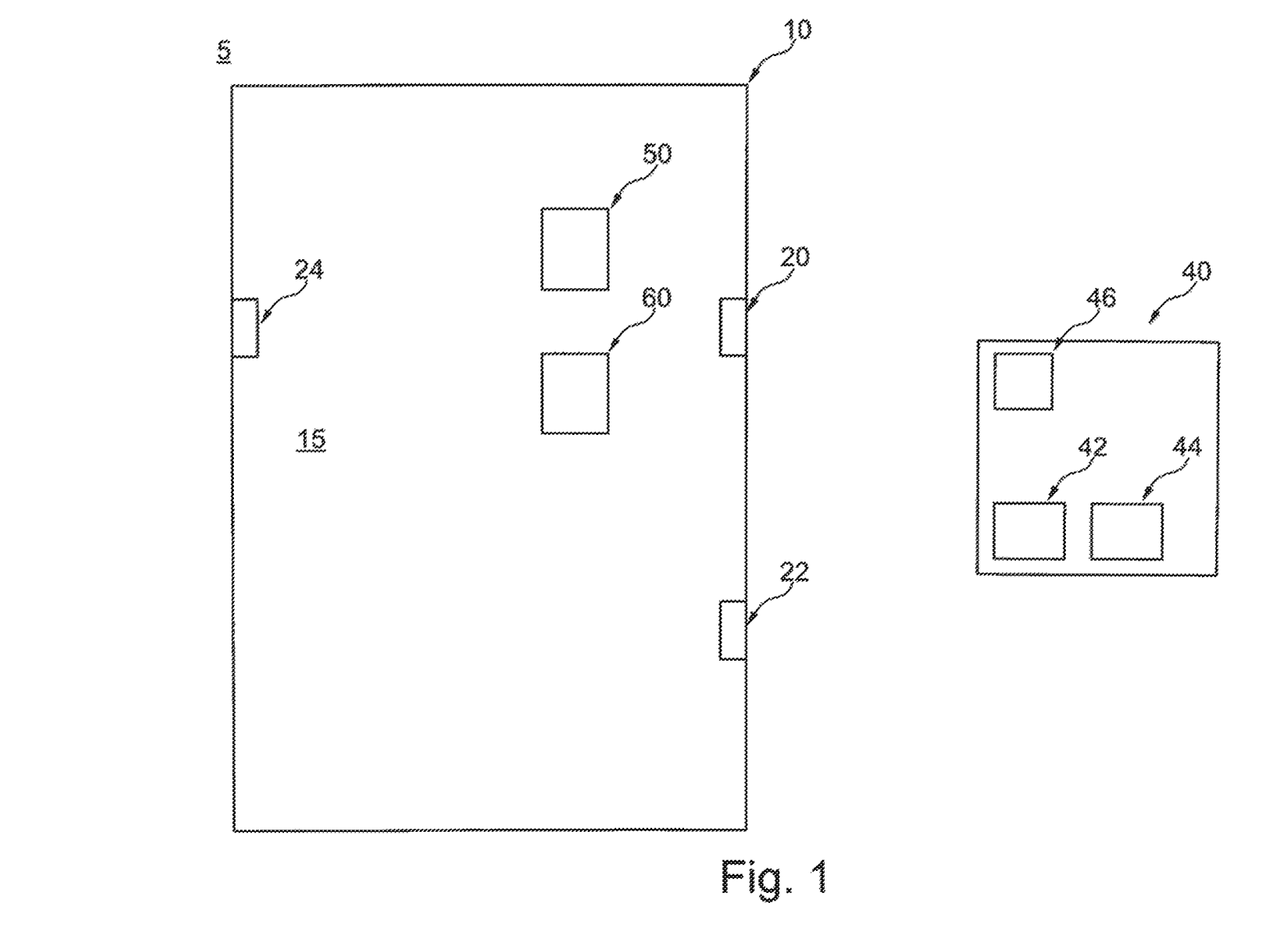
FIG. 1 is an authorization system with an authentication element and a device.

FIG. 1 shows an authorization system 5 for a motor vehicle 10 having a device 15 for the location of an authentication element 40. The authorization system 5 has furthermore transmitting antennas 20, 22, 24 and 26, by means of which a location of the authentication element can be executed.

In the present example, the authentication element 40 is embodied as a key or as a keyless-go means for the motor vehicle 10 and comprises an H-field sensor 42, an inertial sensor 44 for the detection of inertial data in connection with movements and accelerations of the authentication element 40, and a wireless interface 46.

Furthermore, the authorization system has, on the vehicle, a wireless interface 50 and an electronic unit for signal generation and signal detection as well as a function logic forming a compare unit 60. The inertial sensor 44 is a combined MEMS-acceleration- and gyro-sensor, by means of which six degrees of freedom can be verified. The addition of the H-field sensor 42 leads to a (combined) inertial sensor element representing a combined MEMS-acceleration-, gyro- and magnetic sensor. This allows the measurement of a total of nine degrees of freedom.

It is, however, also conceivable, that the inertial sensor element 44 is embodied as a mere MEMS-acceleration sensor with three degrees of freedom.

When the vehicle 10 is approached, the inertial sensor element 44 is activated by a cyclical wake-up signal sent by the vehicle 10.

With the wireless interface 46, the authentication element 40 has a wireless interface for the sending and receiving of location data signals generated on the vehicle, wherein the wireless interface 46 also serves the transmission of the inertial data. In other words, the inertial data interface is also integrated in the wireless interface 46.

With the wireless interface 50 on the vehicle, the device 15 comprises a device for the sending and receiving of the location data signal as well as a location data signal exchange interface being integrated in the wireless interface 50. The location data signal exchange interface serves the exchange of the location signal data with the compare unit 60.

The compare unit 60 comprises a receiving device for the receiving of the location signal data and the inertial data and has a processing unit serving the generation of comparative data based on the location signal data and the inertial data.

Figure 2:
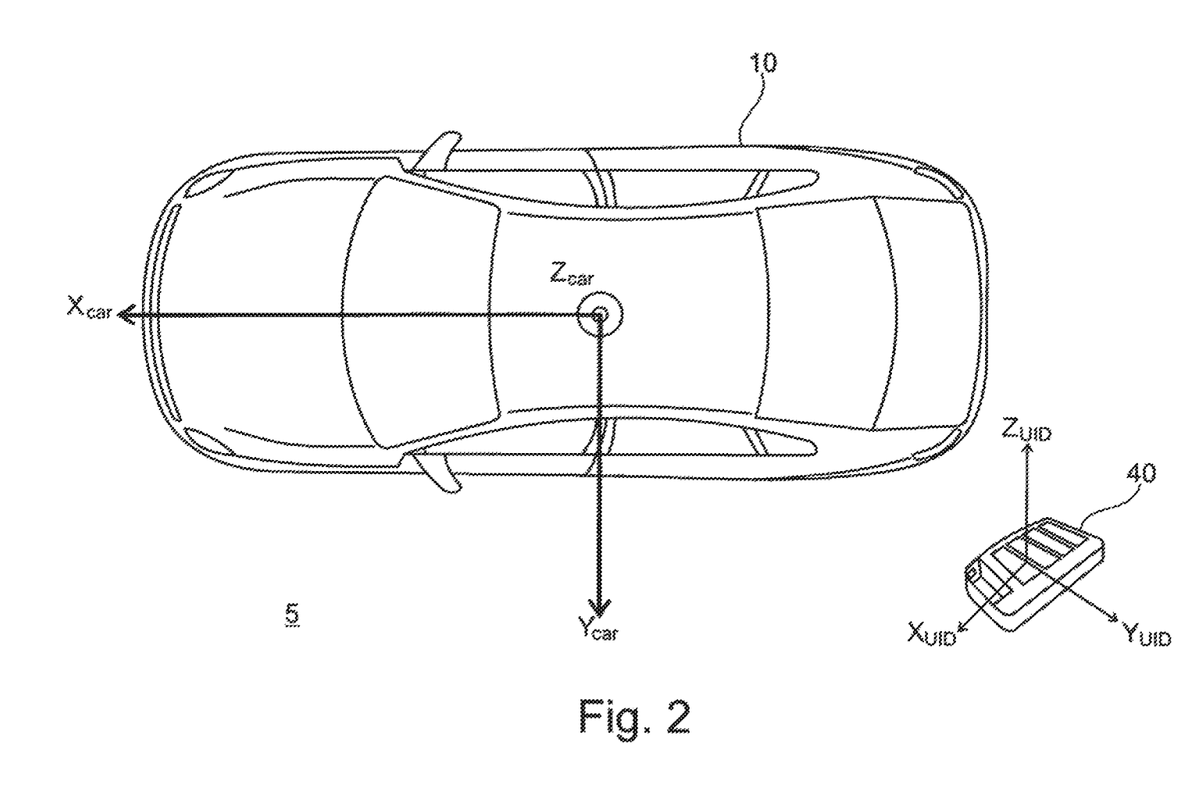
FIG. 2 is a coordinate system for a vehicle as well as a coordinate system for an authentication element.

FIG. 2 shows the coordinate system for the vehicle with the X-axis $X_k$, the Y-axis $Y_k$ and the Z-axis $Z_k$, wherein the coordinate system for the authentication element 40 has a X-axis $X_{UID}$, a Y-axis $Y_{UID}$ and a Z-axis $Z_{UID}$.

In a possible embodiment, the procedure for the verification of the authorization of the authentication system 40 comprises the following steps:

The vehicle cyclically generates a wake-up signal (e.g. a modulated magnetic field signal);

The UID (40) activates the inertial sensor in the UID (40) upon reception of this wake-up signal;

The location data of the authentication element 40 are determined relative to the device 15 (i.e. relative to the vehicle 10);

The inertial data in connection with the movement/acceleration of the authentication element 40 between at least 2 points in time t=t1 and t=t2 are determined;

The location data and the inertial data are compared; and

Depending on the outcome of the comparison of the location data with the inertial data, the authorization of the authentication element 40 is verified.

It is, therefore, verified, whether the movement data (see FIG. 4) being determined by means of several, time-delayed location measurements (e.g. by trilateration per LFH-field measurement (see FIG. 3) or Time-of-Flight (ToF), e.g. based on acoustic signals or Angle-of-Arrival (Aoa)), can be correlated with the data provided by the inertial navigation done by means of the inertial sensor elements 42, 44. Only if this is the case, is the location measurement, which can possibly be attacked by RSA, verified and a relay station attack can be excluded.

By means of the use of several, time-delayed location measurements, it is achieved that the location data comprise the pattern of the location data of the authentication element 40.

An authorization is only assigned when the comparison of the location data with the movement information, which can be derived from the inertial data of the UID (40), shows that these correlate sufficiently.

Beyond that, it can be preferably checked in addition whether the authentication element 40 has more or less come to rest, which would be expected at the moment when the door handle is actuated and which can also be verified by means of location measurement as well as with inertial navigation. In other words, it is for example checked, whether the location data comprise at least one rest position of the authentication element 40. This constraint may in addition be correlated with the event of opening the door.

This results in a possibility of verification—with comparatively little effort—of the location data of the authentication element 40, which have been derived from cost-effective technical implementations, each of which on its own not being necessarily robust against relay station attacks, but which can be protected by means of verification by a RSA-resistant, cost-effective technology, such as the inertial navigation.

In principle, it is also possible that because of the use of the inertial sensor system as the protecting technology, smartphones can for example be included in this context.

In connection with FIG. 3 and FIG. 4, a further possible embodiment shall now be described.

A portable electronic device as the authentication element 40, such as e.g. a remote control key (UID) or a mobile phone serves the authentication of the access authorization and drive authorization while the user of the motor vehicle 10 does not need to hold it in his hand (hands-free entry).

Figure 4:
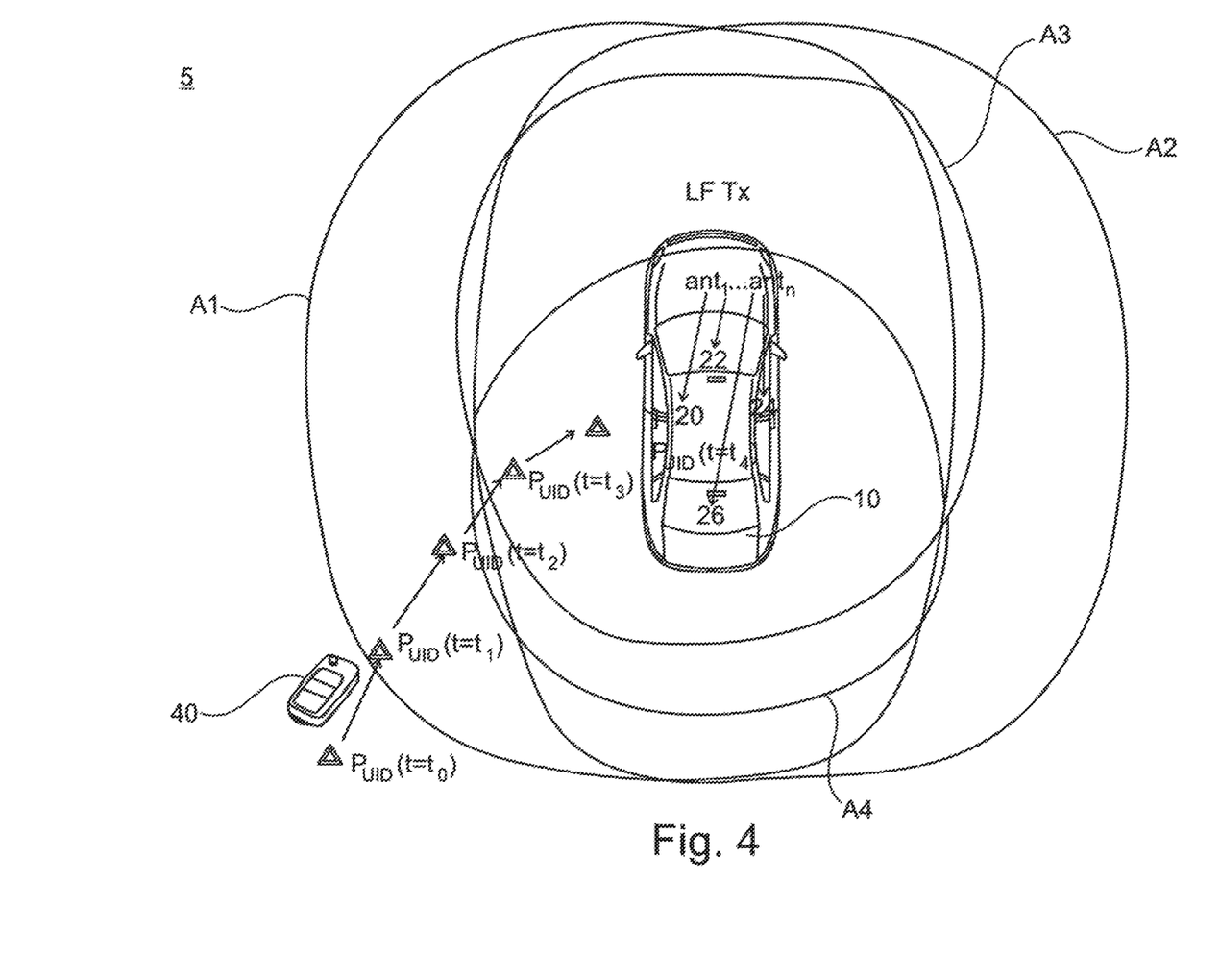
FIG. 4 is a schematic top view of the movement profile of the authentication element relative to the vehicle in connection with an authentication process.

At the moment when the user wishes to gain access to his motor vehicle 10, the authorization of the user is verified as follows:

As can be seen in FIG. 4, the user approaches his motor vehicle 10 and wants to leave with it. To this end, he has the authentication element 40 on him and approaches the motor vehicle 10.

At the point in time t=t0 the position of the authentication element 40 is outside any of the ranges A1, A2, A3, A4, in which the signal sent by the transmitting antennas 20, 22, 24 and 26 of the motor vehicle 10, can be received.

At the point in time t=t1, the authentication element 40 has reached the range A1, whereby the authorization system 5 can recognize, that this is a short distance. In this case, there is a distance of several meters between the vehicle 10 and the authentication element 40.

The recognition, that now the authentication element 40 has approached the vehicle 10, can for example take place because the motor vehicle 10 generates short electrical signals by means of a transmitting antenna, which the authentication element 40 can receive, or the other way around, that the authentication element 40 cyclically generates specific signals, which the authorization system 5 of the motor vehicle can receive.

Figure 3:
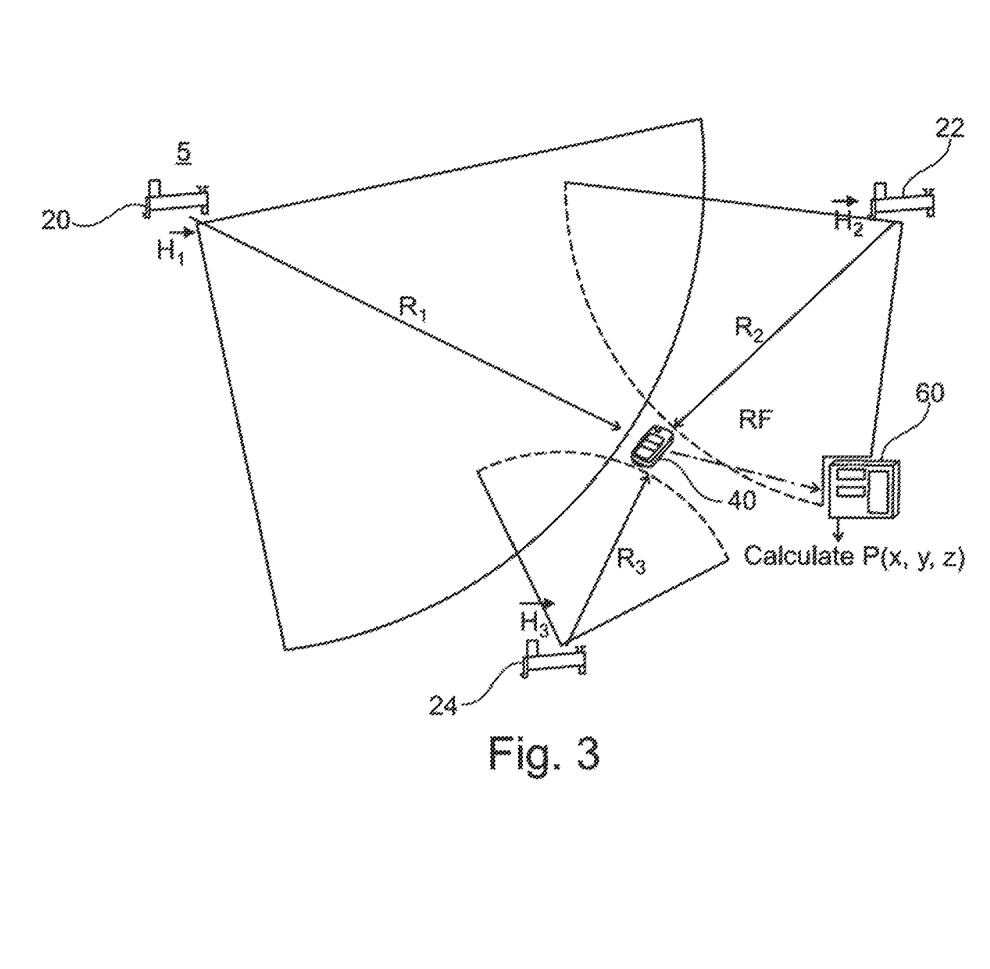
FIG. 3 is a schematic drawing regarding the generation, on the vehicle, of location data of the authentication system element by means of trilateration.

The location coordinate of the authentication element 40 is now determined several times at the points in time t1, t2 to tn by a (any) locating technology, e.g. by means of LF-H-field generation, as shown in FIG. 3.

The transmitting antennae 20, 22, 24 and 26 send signals and by means of the measured signal intensity, the respective distance to the individual antennae 20, 22, 24 and 26 and to the authentication element 40 can be determined, so that the position $P_{UID}$ can be determined from this by means of the compare unit 60.

Between the points in time t1 and t2 to tn, however, the authentication element samples the values of the integrated inertial sensor 44 in a suitably large sampling rate.

It is now made sure that a successful authentication process can only be completed successfully, when the compare unit 60 can suitably correct the data from the inertial navigation and the location data, taking into account the specified tolerances, such as measuring tolerances.

As a matter of principle, this can be carried out when the authentication element 40 itself executes this verification and sends a valid response (valid authentication signal) to the authorization system 5 of the motor vehicle 10 only in case of conformance, which then unlocks; or this can be carried out when the authentication element 40 sends only encoded raw or pre-processed measuring data to the motor vehicle 10, so that the motor vehicle 10 can execute this conformance analysis by means of the authorization system 5 and based on this, can itself decide for or against a successful authentication.

In a normal case, there is always conformance, so that the authentication process can be executed successfully and the user can get access and also a drive authorization for his motor vehicle 10. In case of a RSA, i.e. a transmission path extension, the data from the inertial navigation do not fit the location data $P_{UID}$. In this case, an authentication process would end unsuccessfully and an attack would come to nothing.

In principle, it can also be calculated in addition, whether the location information of the UID $P_{UID}=[xp,yp,zp]$ calculated by means of LF-trilateration (see FIG. 3) lies in a volume range of the vehicle coordinates system, which has been defined as admissible for the UID by the application. By this means, the admissible volume can be limited further and more precisely and above all more application—specifically than the current (state of the art) purely distance-based, more technology-based limitation.

Such an approach is made possible by a change from purely RSSi-based distance-, i.e. range measurement to a more precise location resolution, as is achieved for example by trilateration (e.g. via magnetic field measurement or via time-of-flight measurement of short pulses such as UWB (Ultra Wide Band wireless technology)) or triangulation (in radio-wave-based Angle-of-Arrival approaches).

To achieve a successful authentication, a UID needs to be between z=0 (asphalt level; UID in bag on the ground) and z=2 m (UID on hat) in the area [−60 cm<x<60 cm; 80 cm (door outside)<y<140 cm] (person at arm's length from door handle) or between z=0 (asphalt level; UID in bag on the ground) and z=1 m (at the top in a high suitcase) in a x-y surface several decimeters further away, etc., relative to the vehicle coordinates system.

The current requirement in connection with the drive authorization, namely that a UID needs to be inside the motor vehicle 10 for the granting of a drive authorization, is essentially technology-related.

This seems admissible, but not necessary for the application in a real-life-environment. The position of a key closely under the roof, for example, or in the upper range of the front windscreen etc. could be defined as inadmissible, which would be a limitation of the admissible position.

A RSA-attacker would then be forced to pick-up and restore the signals in a manner, that the UID (whose position is not always known to the attacker) can be assigned a location coordinate in the admissible, now limited region, as it is defined better.

Alternatively or additionally, it can be verified whether the location information $P_{UID}$=[xp,yp,zp] calculated via LF and the H-field component triple $H_{UID\_i}$=[Hix, Hiy, Hiz] measured by the UID and assignable to the n sequentially used antennae (1. . . n), i.e. here the transmission antennae 20, 22, 24, 26, correlate with the H-field component triple— [Hix($P_{UID}$), Hiy($P_{UID}$), Hiz($P_{UID}$) stored preferably on the vehicle in e.g. a look-up table (LuT) and generated for each LF transmission antenna (i) for this location point $P_{UID}$, at least for the field of one transmission antenna (i) (i typically (but not necessarily) n=3) with the spatial point $P_{UID}$ calculated from the trilateration.

As the coordinate system of the UID 40 is variable and initially unknown, a mathematical method (rotation) must be applied to interconvert the coordinate systems. This can for example be achieved by means of algorithms executing the rotation in a manner, that a maximum correlation of the measured H-field triple with the stored one is achieved. By means of this, even the location of the UID in space can be determined retroactively. In the inertial navigation of the UID this serves also to interconvert the two different coordinate systems into one another without an additional, iterative, correlation-optimized rotation method.

The magnetic field triple [Hix(x,y,z), Hiy(x,y,z), Hiz(x,y,z),] belonging to each transmitting antenna antenna (i) is therefore saved for spatial points [x,y,z] in the LuT in a suitable pattern,(e.g. an equidistant pattern of approx. 5 cm to approx. 10 cm in each direction in space and advantageously (because it requires less memory) enlarged pattern dimensions in larger distances in which the values show less changes per volume element anyway). These are either calculated from a simulation, whose calculation is based on the real motor vehicle geometry and/or obtained on a real motor vehicle by measurement.

To achieve successful authentication, it must be possible to rotate the or one $H_{UID}$ vector measured by the UID via mathematical rotation operation, so that there is at least one rotation operation in which the vector rotated in this manner resembles the H-field vector for this location point stored e.g. in the LuT in the motor vehicle 10, taking into account a specified tolerance.

This is explicitly the case for the rotation/conversion into the motor vehicle coordinate system, as for each spatial point, the motor vehicle 10 stores the H-field components expected at this spatial point in its coordinate system.

Thus, a RSA-attacker is forced to pick up and restore the signals so that the orthogonal field components match the location of the UID calculated by means of the location determination (e.g. trilateration).

In a further embodiment, it can be provided, that a single measuring cycle per sensor channel is sufficient for the plausibilization of the location information.

Therefore, the location point $P_{UID}$=[xp,yp,zp] and n H-field component triple [Hix, Hiy, Hiz] is determined with regard to the UID coordinate system by means of LF-trilateration with several (n), sequentially controlled antennae 22, 24, 26. These can be rotated into the motor vehicle coordinate system by means of mathematical operations (rotation). A correlation of the data can then be executed by means of mathematical rotation operations.

To achieve a successful authentication in the connection access/drive authorization, the z-share of the $H_{UID\_i}$ vector measured by the UID must match the z-component from the LuT in defined limits for at least one j, the z-component being known through the inertial sensor system via the orientation of the UID toward the gravity axis of the earth.

Furthermore, it shall be possible that a $H_{UID\_i}$ vector measured by the UID via mathematical rotation operations can be rotated around the gravity axis so that there is at least one rotation operation in which the vector rotated in this manner resembles the H-field vector for this location point stored e.g. in the LuT in the motor vehicle, taking into account a specified tolerance. This is explicitly the case for the rotation/conversion into the motor vehicle coordinate system, as the motor vehicle stores, for each spatial point, the H-field components expected in this spatial point in its coordinate system.

A RSA-attacker is then forced to pick up and restore the signals so that the orthogonal field components match the location of the UID calculated by means of the trilateration and that in addition the converted Hz component needs to have a specific value, and as for the UID, due to its position, only rotations around the z-axis are possible (i.e. in the x-y plane), the restrictions for the other field vectors are distinctly more limited, as the error-minimizing correlation algorithm has only one degree of freedom.

In addition, it can be verified further, whether the motion trajectory, which is determined by several time-delayed location measurements (e.g. via trilateration per LF H-field measurement or Time of Flight (ToF), which are e.g. acoustic-signal-based or Angle-of-Arrival (AoA)-based), can be correlated with the values from the MEMS-based inertial navigation data.

Additionally, it can be preferably checked, whether during the authentication process, the UID is more or less stationary, which is to be expected at the moment when the door handle is activated, i.e. the door is opened, and which can be verified with location measurement as well as with inertial navigation.

In inertial navigation, the missing initial constraint is a problem. For reasons of energy the sensor cannot permanently inquire the MEMS sensor in a fast cycle. Preferably, an initial constraint is achieved by other options (e.g. by "welcome" functions and LF "wake-up signals" sent cyclically by the vehicle) when approaching the motor vehicle.

The inertial navigation starts, thus, at a point in time when the speed of the UID is not known. In connection with at least two successive location measurements, however, location information and, derived from this, speed information can be obtained, which can be used as initial constraint for inertial navigation.

Speeds and covered distances are calculated by integration or double integration of the measured accelerations, gravity acceleration having to be deducted in advance.

As is known, drift, offset errors, and measuring inaccuracies lead to the fact that inertial navigation is not free from errors. However, only short periods are analyzed here, so that sufficient usability of the data is given, which make especially a relay station attack almost impossible, as defined information on the UID movement is imperative.

To achieve successful authentication in connection with access authorization verification, the results of subsequent location measurements (which can be, in principle, attacked via RSA) need to match the inertial navigation data of the UID/the mobile phone.

The correlation of a location by whatever method with inertial navigation in the UID/mobile phone demands, that the UID must in fact run through a movement profile which matches the location trajectory. Furthermore, an attacker would have to ensure that the UID is stationary at the last moment.

LIST OF REFERENCE SIGNS

5 Authorization system
10 Motor vehicle
15 Device for the location of the authentication element
20 Transmitting antenna
22 Transmitting antenna
24 Transmitting antenna
26 Transmitting antenna
40 Authentication element
42 H-field sensor/magnetic field sensor
44 Inertial sensor
46 Wireless interface
50 Wireless interface on vehicle
60 Electronic for signal generation and signal detection and function logic, i.e. compare unit on vehicle

The invention claimed is:

1. An authorization system for a vehicle comprising:
at least one authentication element comprising:
    at least one wireless interface for at least one of the sending and receiving of at least one location data signal generated on the vehicle,
    at least one inertial sensor element for the detection of inertial data in connection with at least one of a movement and an acceleration of the authentication element, and
    at least one inertial data interface for at least one of the sending and receiving of inertial data;
at least one device for the location of the authentication element, the device comprising:
    at least one wireless device for at least one of the sending and receiving of the location data signal, and
    at least one location data signal exchange interface for the exchange of location data signals with a compare unit, and
wherein at least one compare unit is provided, each compare unit comprising:
    at least one reception device for the reception of the location signal data of the authentication element and the inertial data of the authentication element, and
    at least one processing unit for the generation of compare data based on the location signal data and the inertial data.

2. The authorization system according to claim 1, wherein the inertial sensor element is a MEMS acceleration sensor.

3. The authorization system according to claim 2, wherein the inertial sensor element is a combined MEMS-acceleration- and gyro-sensor.

4. The authorization system according to claim 3, wherein the inertial sensor element is a combined MEMS-acceleration-, gyro- and magnetic sensor.

5. The authorization system according to claim 1, wherein the inertial sensor element can be activated by means of a wake-up signal when the vehicle is approached.

6. A procedure for verification of authorization of an authentication element with an authorization system according to claim 1 wherein the procedure comprises at least the following steps:
    determining the location data of the authentication element relative to the device;
    determining the inertial data in connection with at least one movement and/or at least one acceleration of the authentication element between at least two points in time t=t1 and t=t2;
    comparing the location data and the inertial data;
    verifying the authorization of the authentication element by comparing the location data with the inertial data.

7. The procedure according to claim 6, wherein an authorization is only assigned if the comparison of the location data and the inertial data shows that the location data and the inertial data correlate sufficiently.

8. The procedure according to claim 6, wherein during the verification of the authorization, it is checked whether the location data comprise at least one stationary position of the authentication element.

* * * * *